United States Patent
Blainey et al.

(10) Patent No.: US 8,250,315 B2
(45) Date of Patent: Aug. 21, 2012

(54) DYNAMIC NEST LEVEL DETERMINATION FOR NESTED TRANSACTIONAL MEMORY ROLLBACK

(75) Inventors: Robert J. Blainey, Newmarket (CA); C. Brian Hall, Calgary (CA)

(73) Assignee: International Business Machines Corporation, Armonk, NY (US)

( * ) Notice: Subject to any disclaimer, the term of this patent is extended or adjusted under 35 U.S.C. 154(b) by 903 days.

(21) Appl. No.: 12/348,208

(22) Filed: Jan. 2, 2009

(65) Prior Publication Data

US 2010/0174874 A1    Jul. 8, 2010

(51) Int. Cl.
*G06F 12/00* (2006.01)

(52) U.S. Cl. .................... 711/152; 711/E12.078

(58) Field of Classification Search .............. None
See application file for complete search history.

(56) References Cited

U.S. PATENT DOCUMENTS

| | | | |
|---|---|---|---|
| 2008/0288238 A1* | 11/2008 | Heller, Jr. .................. 703/28 |
| 2008/0288726 A1* | 11/2008 | Heller Jr. .................. 711/147 |
| 2008/0288727 A1* | 11/2008 | Baum et al. ............... 711/149 |
| 2008/0288730 A1* | 11/2008 | Heller et al. .............. 711/159 |
| 2008/0288819 A1* | 11/2008 | Heller, Jr. .................. 714/19 |
| 2009/0113443 A1* | 4/2009 | Heller Jr. et al. ........... 718/106 |

OTHER PUBLICATIONS

McDonald, et al; Architectural Semantics for Practical Transactional Memory; Proceedings of the 33rd Int'l Symposium on Computer Architecture, 2006.

Herlihy, et al; Transactional Memory: Architectural Support for Lock-Free Data Structures; Proc. of the 20th Annual Inter'l Symposium on Comp. Architecture, 1993.

McDonald, Austen, et al; Transactional Memory: The Hardware-Software Interface; IEEE, 2007.

Helal, Abdelsalam, et al; Adaptive Transaction Scheduling; ACM, 1993.

Chung, JaeWoong, et al; Tradeoffs in Transactional Memory Virtualization; ASPLOS '06; CM 2006.

Yen, Luke, et al; LogTM-SE:Decoupling Hardware Transactional Memory from Caches; 13th Annual Int'l Symposium on High Performance Computer Architecture (HPCA-13); 2007.

Agrawal, Kunal, et al; Memory Models for Open-Nested Transactions; MSPC'06; ACM 2006.

Moss, J. Eliot B., et al; Nested Transactional Memory: Model and Architecture Sketches; Science Direct; 2006.

Moravan, Michelle J., et al; Supporting Nested Transactional Memory in LogTM; ASPLOS'06; ACM 2006.

\* cited by examiner

*Primary Examiner* — Edward Dudek, Jr.
*Assistant Examiner* — John P Fishburn
(74) *Attorney, Agent, or Firm* — Steven M. Greenberg, Esq.; Carey, Rodriguez, Greenberg & O'Keefe

(57) ABSTRACT

Embodiments of the present invention address deficiencies of the art in respect to nested transaction rollback and provide a method, system and computer program product for dynamic nest level determination for nested transaction rollback. In an embodiment of the invention, a nested transaction rollback method can be provided. The method can include detecting a violation of a block of memory accessed within a set of nested transactions, retrieving a tentative rollback level for the violation, discarding a speculative state for the block of memory at each level of the set of nested transactions up to and including the tentative rollback level, refining the tentative rollback level to a lower level in the set of nested transactions, and additionally discarding a speculative state for the block of memory at additional levels in the set of nested transactions up to and including the refined rollback level.

6 Claims, 2 Drawing Sheets

DYNAMIC NEST LEVEL DETERMINATION FOR NESTED TRANSACTIONAL MEMORY ROLLBACK

REFERENCE TO CO-PENDING APPLICATIONS FOR PATENT

The present application is related to the following co-assigned U.S. patent applications, which are expressly incorporated by reference herein:

U.S. application Ser. No. 12/348,216, entitled "PRIORITIZATION FOR CONFLICT ARBITRATION IN TRANSACTIONAL MEMORY MANAGEMENT" (docket no. CA920080027US1 (094U)), filed on Jan. 2, 2009.

BACKGROUND OF THE INVENTION

1. Field of the Invention

The present invention relates to the field of transactional memory utilization in parallel computing and more particularly to nested transactional memory rollback in parallel computing.

2. Description of the Related Art

Transactional memory techniques attempt to simplify parallel programming by allowing a group of load and store instructions to execute in an atomic way. Generally speaking, transactional memory is a concurrency control mechanism analogous to database transactions for controlling access to shared memory in concurrent computing. However, unlike the locking techniques used in most modern multithreaded applications, transactional memory can be viewed as optimistic in that a thread completes modifications to shared memory without regard for the activities of other threads, while recording every performed read and write and buffering the speculative changes to memory.

Transactions conflict when two or more transactions access the same block of memory, and at least one of those accesses is a write access. When utilizing transactional memory, instead of placing the onus on the reader or writer of a block of memory to ensure that the execution of a transaction does not conflict with other transactions in progress, the onus is placed on the transactional memory system to verify that other threads have not concurrently made conflicting references to the block of memory. Such a transactional memory system can be realized in software, hardware, or a combination of the two. The operation in which the memory references of a transaction are checked against other concurrent memory references is often referred to as validation. If validation is successful, at the conclusion of a transaction all memory changes are made permanent in an operation often referred to as a commit. Yet, a transaction can abort at any time, causing all of prior changes performed by the transaction to be rolled back or undone. If a transaction cannot be committed due to conflicting changes, the transaction can be aborted and re-executed from the beginning until the transaction succeeds.

It will be recognized by the skilled artisan, then, that the benefit of the optimistic approach of transactional memory is increased concurrency. Specifically, in the optimistic approach known in the art, no thread of execution need to wait to access a block of memory. Further, different threads of execution can safely and simultaneously modify disjoint parts of a data structure that would otherwise be protected under the same lock. Overall, despite the overhead incurred in retrying failed transactions, in many realistic programs conflicts arise rarely enough that transactional memory techniques may provide an immense performance gain over lock-based protocols on large numbers of processors.

While in many instances, rolling back a failed transaction can be a simple operation of little consequence, a large monolithic transaction can provide a more complex challenge. In the face of a large transaction, an abort deep into the execution will require rolling back and re-executing the entire transaction, potentially repeating a substantial amount of work. To address the challenge of a substantial rollback, nested transactions provide a mechanism in which a grouping of transactions can be nested in respect to one another so that rolling back the grouping requires only a rolling back of transactions up to and including a nest level affected by a conflict scenario. Rolling back only part of a linear nest of transactions minimizes the amount of work that must be repeated by re-execution.

To support the rollback of transactions, a transactional memory system must preserve the original contents of memory locations when speculative changes are made, should an abort require that those changes be undone. To support nested transactions, the transactional memory system must additionally record information about the nesting level at which each memory reference is made, and in order to roll back each nest level independently it must preserve the previous contents of memory locations when speculative changes are made at each nesting level. Upon detecting a conflict in association with a block of memory, the nest level associated with the conflicted block of memory can be recalled and each transaction at each level leading up to the associated nest level can be rolled back with corresponding values restored at each nest level. As long as the values written at each nest level are available for the rollback process, each nest level can be rolled back independent of other nest levels, guaranteeing the minimal rollback required by a conflict scenario. Given the requirement to store substantial data in respect to write operations at each nest level for a nested group of transactions, the bookkeeping requirements can be significant. Notably, in a transactional memory system realized in hardware there is considerably complexity in preserving multiple versions of each memory block in the cases where the memory block is modified at multiple transaction nesting levels.

Despite the convenience of substantial hardware support for nested transaction processing, a more simplistic scheme is possible as well. In the simplistic scheme, only the original contents of memory locations are preserved when speculative changes are made, and when speculative changes are made at multiple nesting levels the previous speculative values are not preserved. While in many conflict scenarios, the information stored by the simplistic scheme suffices in the same way as the substantial support, occasions arise where resource intensive processing is required to compute a nest level required for rollback. This occurs when a value has been written to a block of memory at multiple nest levels, and not having saved the last written value at each nest level the nesting levels cannot be rolled back independently from one another. If a nest level where the latest write to a memory block took place is rolled back, then it is necessary to continue rolling back all the way up to and including the first nest level where that block was written to. The simplistic hardware scheme avoids the bookkeeping complexity introduced by saving multiple modified versions of a memory block, one for each nest level where the block is written to, but at the expense of additional rollback in certain conflict scenarios. Notably, in a transactional memory system realized in hardware the simplistic scheme may be attractive in lower cost implementations where the highest levels of performance are not required.

BRIEF SUMMARY OF THE INVENTION

Embodiments of the present invention address deficiencies of the art in respect to nested transaction rollback and provide a novel and non-obvious method, system and computer program product for dynamic nest level determination for nested transaction rollback. In an embodiment of the invention, a nested transaction rollback method can be provided. The method can include detecting a violation of a block of memory accessed within a set of nested transactions, retrieving a tentative rollback level for the violation, discarding a speculative state for the blocks of memory at each level of the set of nested transactions up to and including the tentative rollback level, potentially refining the tentative rollback level to a lower level in the set of nested transactions, and additionally discarding a speculative state for the blocks of memory at additional levels in the set of nested transactions up to and including the refined rollback level. Refining of the tentative rollback level is required only in the simplistic scheme of bookkeeping for nested transaction support. Notably, this nested transaction rollback method is independent of the underlying nested transaction support and is applicable to either the substantial or simplified scheme of support.

In an aspect of the embodiment, refining the tentative rollback level to a lower level in the set of nested transactions can include determining if the block of memory is accessed as part of a write directive, setting the tentative rollback level to a nesting level for a first writing to the block of memory if the block of memory is accessed as part of a write directive and if the nesting level is at a lower level in the set of nested transactions than the tentative rollback level, and otherwise not changing the tentative rollback level. In another aspect of the embodiment, the method also can include repeating the discarding of speculative state and the refining of the tentative rollback level for each block of memory accessed for each transaction at each level of the set of nested transactions up to and including the tentative rollback level.

In another embodiment of the invention, a multiprocessor computer data processing system can be provided. The system can include memory and multiple different processors, each coupled to the memory, and each providing an instruction set architecture (ISA) supporting nested transaction processing for a nested set of transactions. The system also can include dynamic nest level determined rollback logic disposed in hardware or software for each of the processors. The logic can include support enabled to dynamically determine a rollback level requisite to rollback the nested set of transactions by reference only to a tentative rollback level and speculative value maintained for a corresponding one of the processors. In this regard, the tentative rollback level can include a minimum nesting level required to rollback the nested set of transactions in response to a violation or abort in respect to a block of the memory.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for dynamic rollback nest level determination for nested transaction rollback. In accordance with an embodiment of the present invention, a conflict can be detected for a nested transaction in respect to an affected block of memory. For the affected block of memory, a tentative rollback nest level for nested transaction rollback can be retrieved from hardware. In this regard, only the tentative rollback nest level need be maintained in hardware as, in the case of a conflict arising from an attempted read from the affected block of memory that the aborted transaction has written—the nest level for first write access to the affected block of memory, or in case of a conflict arising from an attempted write to an affected block of memory that the aborted transaction has read or written—the nest level for the first read or write access to the affected block of memory. Any such transactional memory hardware must maintain this rollback information. In a substantial hardware implementation this rollback level will always be the actual level of rollback that must take place, since it is guaranteed that nesting levels can be rolled back independently. In the simplistic hardware scheme this rollback level will be tentative because nesting levels cannot necessarily be rolled back independently.

Beginning with the innermost nest level of the nest of transactions, the speculative state for each affected block of memory can be discarded and the tentative rollback nest level retrieved from hardware can be refined as necessary with the process continuing for each nest level of the nested transaction up to and including the refined rollback nest level. Mechanically then, once a tentative rollback nest level has been computed for a contemporaneous nest level, the nest level then can be decremented and the process can repeat for the new nest level. The process can repeat until reaching the refined rollback nest level indicating that no further rollback is required. In consequence, rollback can be automated through a dynamic determination of rollback nest level while requiring only a minimum of hardware support in respect to recording the values written to a block of memory at different nest levels.

Figure 1:
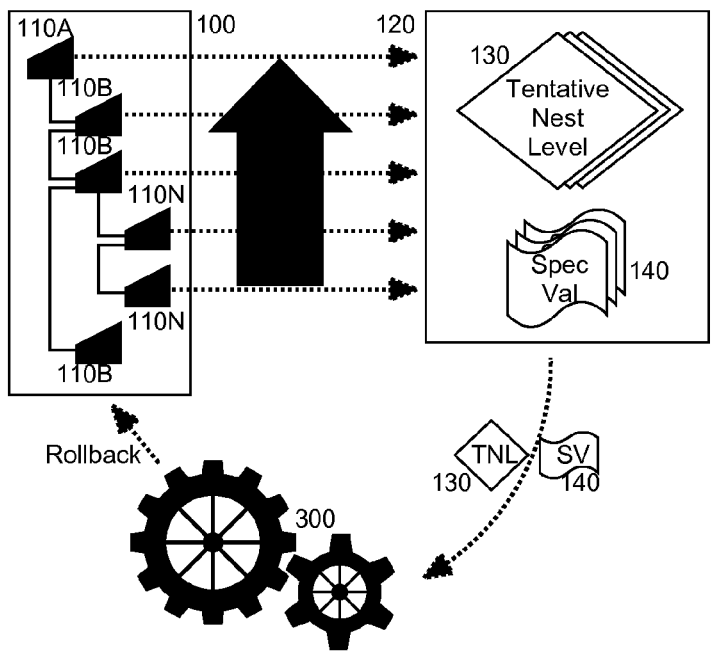
FIG. 1 is a pictorial illustration of a process for dynamic rollback nest level determination for nested transaction rollback.

In further illustration, FIG. 1 pictorially shows a process for dynamic rollback nest level determination for nested transaction rollback. As shown in FIG. 1, a nested set of transactions 100 can include different transactions 110A, 110B, 110N at different nesting levels in the nested set of transactions 100, each of the different transactions 110A, 100B, 110N accessing a block of memory either by way of a read or write. Processor 120 directing the transactions 110A, 110B, 110N can maintain a tentative rollback level 130 in hardware for each block of memory accessed by a given one of the transactions 110A, 110B, 110N, along with a speculative value 140, to be applied in the circumstance that a corresponding one of the transactions 110A, 110B, 110N is a write operation. In the simplistic hardware scheme, only the most recent speculative value written to a memory location by the nest of transactions must be maintained, as compared to the substantial hardware implementation where the most recent speculative value written to a memory location at each nesting level must be maintained.

Upon detecting an error in a block of memory affected by one of the nested transactions 110A, 110B, 110N, dynamic nest level determined rollback logic 300 can select an innermost nesting level in the nested set of transactions 100 and can retrieve a tentative rollback level 130 and associated speculative value 140 for the block of memory affected by the error. To the extent that the subject one of the nested transactions 110A, 110B, 110N is a write, the tentative rollback level 130 can be refined to be the first write nest level value for the block if the first write nest level value is less than the tentative rollback level 130. Additionally the speculative value 140 can be discarded. This process can repeat for each block of memory accessed in the affected one of the nested transactions 110A, 110B, 110N.

Once all blocks of memory have been addressed, the next most inner nesting level in the nested set of transactions 100 can be selected and the process can repeat until the refined form of the tentative rollback level is the same as the currently selected nesting level in which case the rollback process will have completed. Once the rollback has been completed, a restart can be directed for the nested set of transactions 100. In this way, the rollback level requisite to properly rolling back the nested set of transactions 100 can be determined dynamically utilizing a minimum of hardware in the processor 120 to store speculative values 140.

Figure 2:
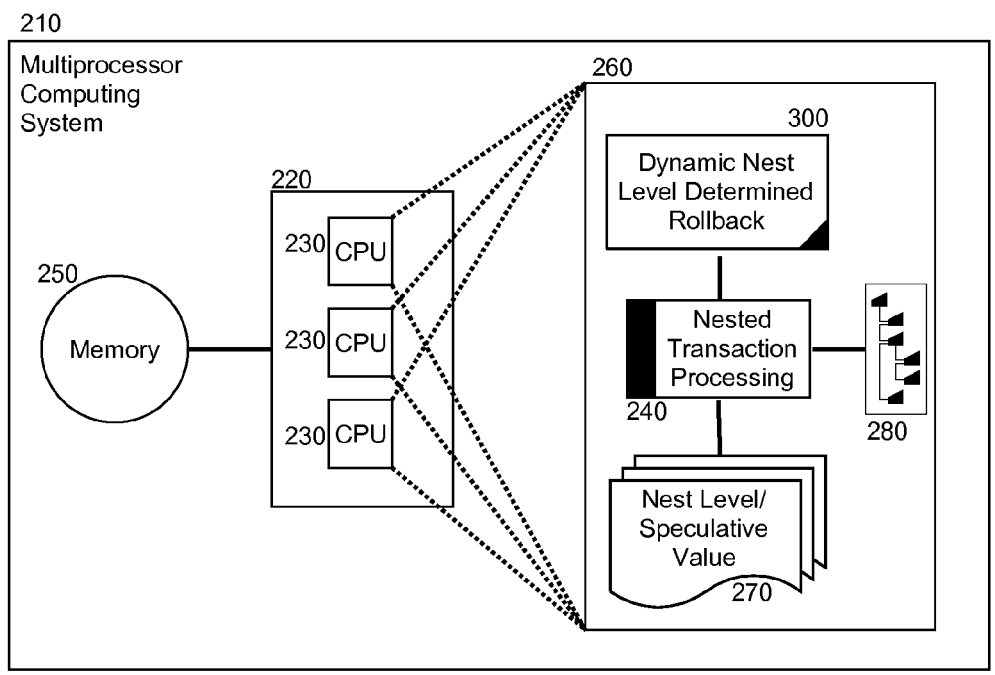
FIG. 2 is a schematic illustration of a data processing system configured for dynamic rollback nest level determination for nested transaction rollback; and, FIG. 3 is a flow chart illustrating a process for dynamic rollback nest level determination for nested transaction rollback.

The process described in FIG. 1 can be implemented within a transactional memory system for a multiprocessor computing system. In illustration, FIG. 2 schematically depicts a data processing system configured for dynamic rollback nest level determination for nested transaction rollback. The system can be a multiprocessor computing system 210 including multiple different processors 230 in a multiprocessor arrangement 220, each coupled to common memory 250. Each of the processors 230 can provide an ISA supporting nested transaction processing 240 for a nested set of transactions 280.

Notably, the transactional memory support of each of the processors 230 can include dynamic nest level determined rollback logic 300. The dynamic nest level determined rollback logic 300 can include logic enabled to dynamically determine a rollback level requisite to rollback the nested set of transactions 280 by reference only to a tentative rollback level and speculative value 270 stored by the processor 230. In this regard, the tentative rollback level can include a minimum nesting level required to properly rollback the nested set of transactions 280 in response to a violation or abort in respect to a block of the memory 250. By way of example, the tentative rollback level can be a nesting level at which a first access occurs where the violation results from an outside write operation to the same block of the memory 250, or a nesting level at which a first write occurs where the violation results from an outside read operation for the same block of the memory 250.

Figure 3:
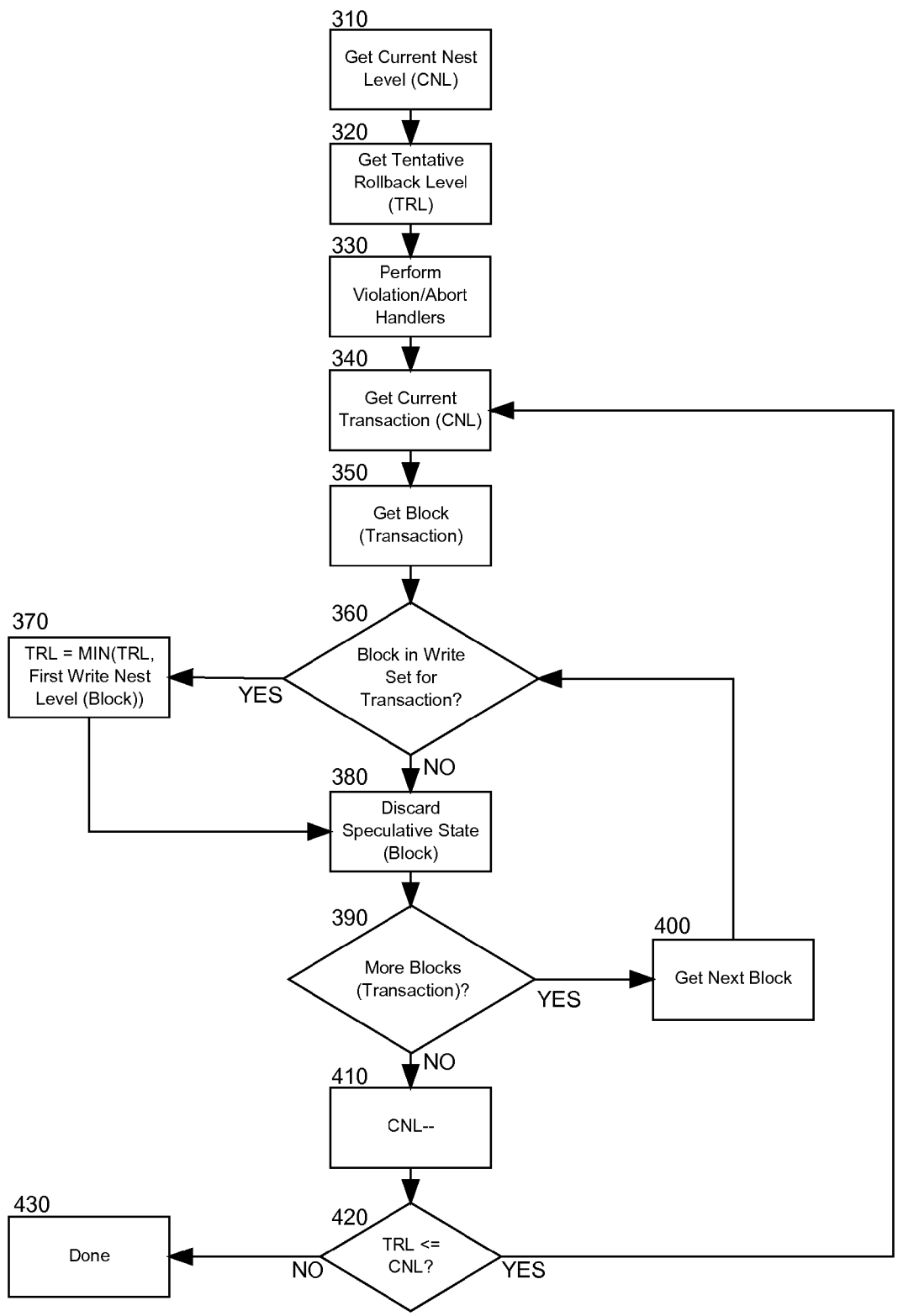

In further illustration of the operation of the dynamic nest level determined rollback logic 300, FIG. 3 is a flow chart illustrating a process for dynamic rollback nest level determination for nested transaction rollback. Beginning in block 310, in response to the detection of a violation or an abort for a block of memory in a nested set of transactions, a current nest level can be determined for the nested set of transactions relative to the violation. In block 320, a tentative rollback level can be retrieved from the processor in respect to the violation. In block 330, preferred violation and abort actions can be performed ancillary to the rollback as set forth by fault handling application code executing in conjunction with the processor. Thereafter, in block 340 a transaction associated with the violation can be determined and a first block of memory referenced by the transaction also can be determined in block 350.

In decision block 360, it can be determined whether or not the referenced block of memory is affected by a write directed for the transaction. If so, the tentative rollback level can be refined in block 370 to be the minimum of the tentative rollback level and the nest level at which the block of memory is first written in the nested set of transactions. Subsequently, in block 380 the speculative state for the block of memory can be discarded. In decision block 390 if additional blocks of memory are implicated by the transaction, in block 400 a next block of memory implicated by the transaction can be selected and the process can repeat through decision block 360. When all blocks of memory implicated by the transaction have been handled, the process can continue through block 410.

In block 410, the current nest level can decrement so as to traverse the nested set of transactions outwardly. In decision block 420, so long as the tentative rollback level as refined in block 370 is less then or equal to the current nest level, the process can repeat through block 340 with the selection of a transaction for the current nest level. Otherwise, the process can end in block 430.

Embodiments of the invention can take the form of an entirely hardware embodiment, an entirely software embodiment or an embodiment containing both hardware and software elements. In a preferred embodiment, the invention is implemented in firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A nested transaction rollback method comprising:
   detecting a violation of a block of memory accessed within a set of nested transactions;
   retrieving a tentative rollback level for the violation;
   discarding a speculative state for the block of memory at each level of the set of nested transactions up to and including the tentative rollback level;
   refining the tentative rollback level to a lower level in the set of nested transactions; and,
   additionally discarding a speculative state for the block of memory at additional levels in the set of nested transactions up to and including the refined rollback level.

2. The method of claim 1, wherein refining the tentative rollback level to a lower level in the set of nested transactions, comprises:
   determining if the block of memory is accessed as part of a write directive;
   setting the tentative rollback level to a nesting level for a first writing to the block of memory if the block of memory is accessed as part of a write directive and if the nesting level is at a lower level in the set of nested transactions than the tentative rollback level; and,
   otherwise not changing the tentative rollback level.

3. The method of claim 1, further comprising repeating the discarding of speculative state and the refining of the tentative rollback level for each block of memory accessed for each transaction at each level of the set of nested transactions up to and including the tentative rollback level.

4. A computer program product comprising a non-transitory computer usable medium embodying computer usable program code for nested transaction rollback, the computer program product comprising: computer usable program code for detecting a violation of a block of memory accessed within a set of nested transactions; computer usable program code for retrieving a tentative rollback level for the violation; computer usable program code for discarding a speculative state for the block of memory at each level of the set of nested transactions up to and including the tentative rollback level; computer usable program code for refining the tentative rollback level to a lower level in the set of nested transactions; and, computer usable program code for additionally discarding a speculative state for the block of memory at additional levels in the set of nested transactions up to and including the refined rollback level.

5. The computer program product of claim 4, wherein the computer usable program code for refining the tentative rollback level to a lower level in the set of nested transactions, comprises:
   computer usable program code for determining if the block of memory is accessed as part of a write directive;
   computer usable program code for setting the tentative rollback level to a nesting level for a first writing to the block of memory if the block of memory is accessed as part of a write directive and if the nesting level is at a lower level in the set of nested transactions than the tentative rollback level; and,
   computer usable program code for otherwise not changing the tentative rollback level.

6. The computer program product of claim 4, further comprising computer usable program code for repeating the discarding of speculative state and the refining of the tentative rollback level for each block of memory accessed for each transaction at each level of the set of nested transactions up to and including the tentative rollback level.

* * * * *